United States Patent Office 2,999,200
Patented Sept. 5, 1961

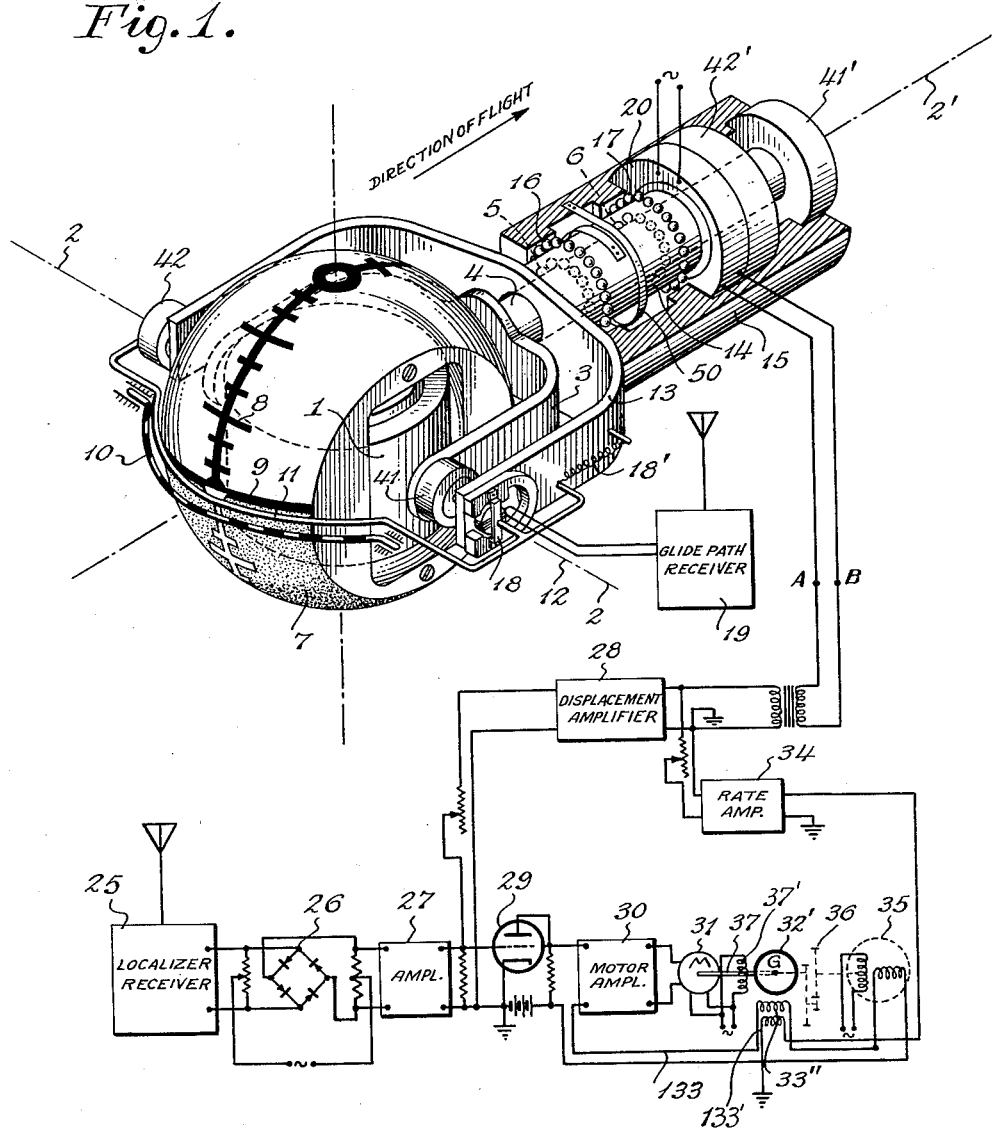

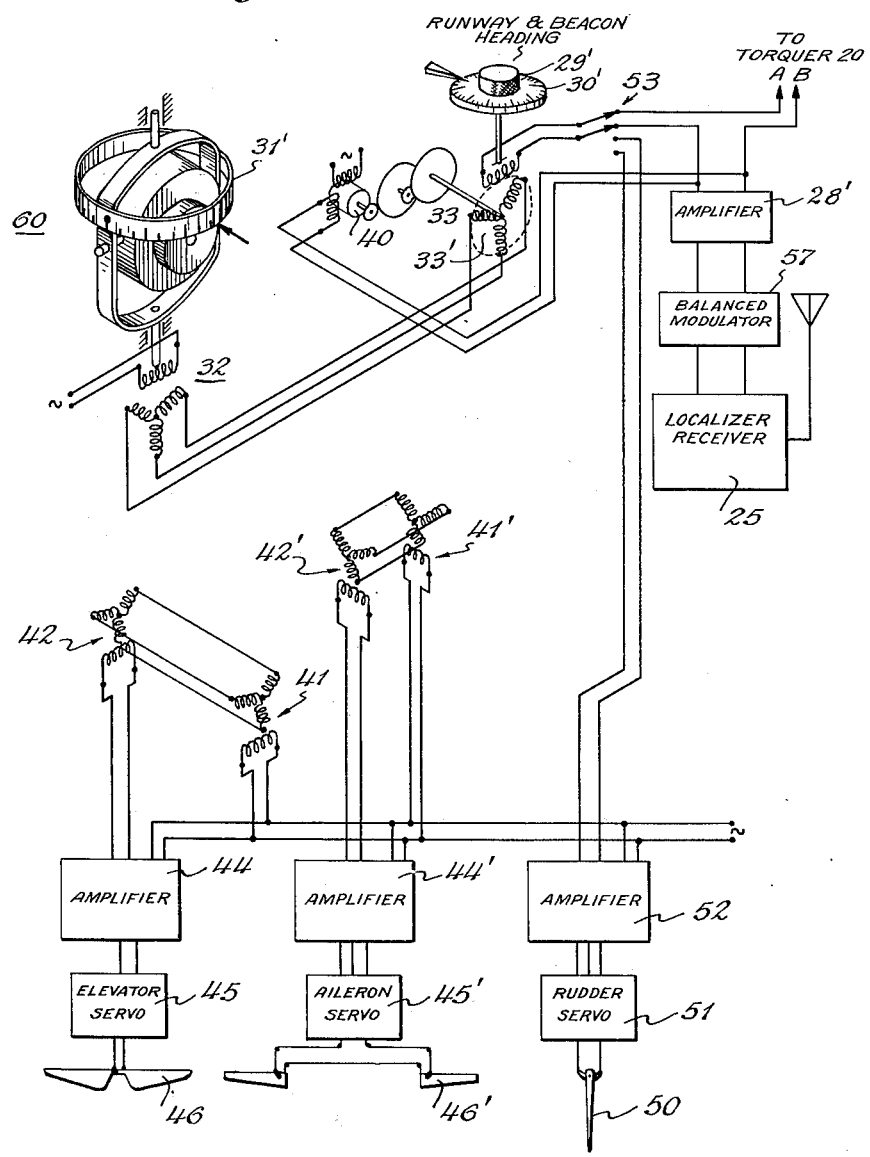

2,999,200
BLIND LANDING INDICATOR AND SERVO-
CONTROLLER FOR AIRCRAFT
Orland E. Esval, Huntington, N.Y., assignor to Sperry
Rand Corporation, a corporation of Delaware
Original application Feb. 5, 1947, Ser. No. 726,605,
now Patent No. 2,613,050, dated Oct. 7, 1952. Divided and this application June 14, 1952, Ser. No. 293,527
10 Claims. (Cl. 318—489)

This invention relates to radio blind landing indicators for aircraft. The present procedure in making a blind landing obliges the aviator to observe not only the conventional cross pointer radio actuated meter which is responsive to the glide path and localizer radio beams, but also to observe the standard attitude, navigational and airspeed instruments, including the directional gyro and attitude gyroscope, sometimes referred to as the gyro-vertical or artificial horizon. The result is that a blind landing operation has become one of the most difficult flying procedures and is only attempted under blind flying conditions by the most skillful and experienced pilots and is avoided whenever possible.

According to the present invention a unitary instrument is provided for use in blind landing on which is shown clearly how the aviator should fly, either up or down or right or left to maintain the plane on the glide path and localizer beams and at the same time there is shown the true attitude of the plane so that the aviator may at all times know exactly what attitude the plane is in and hence avoid getting into a dangerous attitude in blindly following a radio cross pointer meter.

To accomplish this purpose, I propose that after setting his correct approach airspeed, the aviator, in conducting a blind landing, need observe only a single instrument, such as, an attitude gyroscope or a single face representing an attitude gyroscope and having crossed horizontal and vertical markings on the face of which there is provided an auxiliary bar or index controlled in bank by the localizer beam and in pitch by the glide path beam. According to this instrument when the plane gets above or below the glide path beam, a down or up signal is shown by the aforesaid index on the attitude gyro, causing the aviator to attempt to restore the auxiliary bar to its normal position in line with the equator on the stabilized sphere. Similarly as the plane departs to the right or left of the localizer beam, this bar is tilted or "banked" in a direction and amount such that the aviator in attempting to apparently right the plane puts in a bank in the proper direction and a proper amount to turn the craft back into the localizer beam smoothly and without overshooting.

Preferably the signals fed into the controller of the auxiliary index in bank are a combination of a displacement signal, that is, a signal proportional to the displacement of the craft laterally from the localizer beam, combined with a second signal which is a function of the rate of change of such displacement. By combining these two factors an asymptotic approach to the beam may be achieved.

According to a modification, the second signal fed into my blind landing indicator to cause tilt of the auxiliary bar may be a function of the difference between the runway direction and compass heading of the craft, of which, in the final analysis the rate of change of displacement is a function.

In addition to or in lieu of employing my invention as an attitude indicator and course changer, it likewise is readily adapted to control an automatic pilot for aircraft to guide it along a radio defined course. My invention is also not necessarily limited to being used in blind landing or in radio approaches to landing fields, but may be employed throughout a flight for maintaining the craft on a radio defined course, if desired.

This application is a division of my prior application for Blind Landing Indicator and Controller for Aircraft, now Patent No. 2,613,050, dated October 7, 1952, the present application relating primarily to the modification shown in FIG. 2.

Referring to the drawings showing the several forms of my invention above described, FIG. 1 is a perspective view of my blind landing indicator, showing also a wiring diagram of the input to the same from glide path and localizer beams; and FIG. 2 shows a modified method of obtaining the input to such an indicator from a position maintaining device, FIG. 2 also showing a wiring diagram of an automatic pilot system showing how the same would be controlled from both the attitude gyro of FIG. 1 and the directional gyroscope or gyromagnetic compass during normal flight and from the attitude gyroscope alone (as influenced by the radio glide path and localizer beams) during blind landing operations.

My improved indicator may utilize any known type of gyroscopically stabilized artificial horizon or gyroscope, the type shown being of the form described in the prior patent application of Wrigley, Esval and Haskins, now Patent No. 2,546,989, dated April 3, 1951 for Attitude Gyros.

According to this system, the sensitive element preferably consists of a rotor (not shown) mounted for spinning about a normally vertically spinning axis within rotor casing 1. The casing is mounted for oscillation about a transverse axis 2 in the gimbal ring 3, which may be U-shaped to afford a full view of the indications from the instrument. Gimbal ring 3, in turn, is mounted for freedom about a fore-and-aft axis 2' by means of long trunnion 4 mounted in spaced bearings 5 and 6. The casing 1 may be formed as, or enclosed within, a hollow truncated sphere 7 on which latitude graduations 8 are placed with a central equatorial marking 9. Preferably the lower half of the sphere is of different color from the upper half. The fixed reference bar 10 extends across the face of the instrument so that pitch is indicated by the up and down movements of the equator or horizon marking 9 and the graduations 8 with respect to the reference 10 and roll by the tilt of the equator or horizon marking 9 with respect to the reference 10.

On such an attitude gyroscope, I provide an additional reference index 11, which may be colored differently from index 10, as for instance, by being made red, while the index 10 is checked black and white. Index 11 normally lies in a horizontal line with the equator 9 and the reference 10, but the position of the index 11 is controlled in pitch from the radio glide path receiver and in roll from the localizer beam. To accomplish this, the index 11 is pivoted independently of the gyroscope. For up and down movement it is pivoted about an axis 12 in a second gimbal 13, the axis 12 normally being in line with the aforesaid axis 2 of the rotor frame. The gimbal 13, in turn, is pivoted in bank by having a long sleeve bearing 14 at the rear journalled in spaced bearings 16, 17 in the fixed support 15 in the instrument case (not shown). A centralizing spring 50 is shown to hold gimbal 13 and its attached index athwartship or normally horizontal.

The pitch of the bar 11 is governed by a motor 18 of the torque or meter type, operating against a centralizing spring 18'. The input to the motor 18, in turn, is controlled from the output of the glide path receiver 19 in a manner resembling the control of the horizontal pointer of the cross pointer meter shown in the prior patent of Percy Halpert, No. 2,502,721, dated April 4, 1950, for Instrument Landing Indicators (see FIG. 2), Likewise the twist or lateral inclination of the bar 11 is controlled from a second torque motor 20 connected to the spring centralized sleeve 14 and controlled generally from the localizer receiver. Since the index 11 is normally centralized when no radio signals are present, it may be used as the sole index for the gyroscope and index 10 omitted. In other words, the bank and pitch of the craft may be controlled by observing the relative tilt and up and down positions of horizon bar 9 and index bar 11.

Preferably there is introduced into the directional controls at least, not only a signal responsive to the departure of the airplane from the beam, but also the rate of departure. In other words, if it is desired to impart to the aviator a signal showing the rate and direction of turn necessary for best results, the rate of turn set in should be proportional to the sum of the displacement from the beam and rate of such displacement away from the beam, or a function of such rate. It is also known that a craft may be caused to turn by banking the craft alone, the rate of turn being a function of the banking angle and airspeed. In my device, therefore, I propose to introduced a tilt or bank into the index 11 proportional to the combination of the displacement from the beam and also the rate of change of such displacement. Since the latter, rate of change of displacement, is also a function of airspeed, the airspeed factor is thus, in large part, automatically taken care of, and also by designing the instrument for the airspeed usually employed in approach landing, the airspeed factor need not enter.

It has been found that when an aircraft is controlled in this manner, that is, making the instantaneous rate of turn proportional to the sum of displacement and rate of displacement signals, the craft is capable of an asymptotic approach to the localizer beacon course. Thus if the pilot keeps the red bar 11 in line with the horizon line 9 on the gyro, he will make an asymptotic approach to the course merely by observing this single instrument and without having to refer to any additional cross pointer meters, directional gyros or turn indicators on the craft. This system has the further advantage that cross winds do not cause an error, since the actual gyro heading is not shown but only the radio course.

For this purpose, I have shown in the wiring diagram the D.C. signal from the localizer receiver 25 applied to a ring modulator 26, which is also supplied with A.C. to give a variable A.C. output which is amplified in amplifier 27 and supplied to the displacement amplifier 28 from which the signal is led to the torque motor 20. The rate of change of such signal is shown as obtained by also supplying the signal from amplifier 27 to a suitable rate taking network. As shown this signal is first applied to the grid of electron tube 29, the output of which controls, through amplifier 30, a motor 31 driving a speed generator 32' giving an A.C. output voltage proportional to its speed and reversible in phase with its direction of rotation. The output of such generator is induced in one 33" of the two windings 37' and 33" arranged in quadrature around the armature 32', and is supplied to the rate amplifier 34 and combined with the output of the displacement amplifier 28 to control the motor 20. A feedback to the input of amplifier 30 is also provided from a transmitter 35 driven preferably at a reduced speed through step-down gearing 36 from the motor generator shaft 37, such transmitter serving to normally oppose the signal from tube 29 to wipe it out as soon as the angle through which the transmitter is turned becomes sufficient. Hence a speed signal only reaches amplifier 34 while the displacement is changing which is proportional to the rate of displacement change. Tube 29 acts to block any feedback into the displacement signal supplied to amplifier 28. The rate signal of generator 32' may also be fed back as a damping factor to amplifier 30. Preferably a separate speed winding 133' is employed for this purpose which is shown as connected in service with transmitter 35 and through lead 133 to the input to the amplifier 30.

As indicated above, it is desired to govern the craft's heading in such manner that it will be brought onto the beam and kept there by altering the craft's heading in an amount such as to cause it to fly into the region of the radio beam without overshooting.

FIG. 2 represents a second form of the invention in which the displacement signal from the localizer is combined with a signal representing the angular difference in azimuthal positions between the runway beam or beacon and the compass heading of the craft. The greater this angle, the greater the rate of change of displacement should be. As shown in the aforesaid patent of Percy Halpert, this may be accomplished readily by combining the output of the localizer amplifier 28' derived from the output of localizer receiver 25 as in FIG. 1, for instance, with an output proportional to the difference in azimuth angular position or heading between the runway heading (or localizer direction in azimuth), which may be set in by a knob 29' and dial 30' and the craft's heading represented by a compass card 31' on a directional gyroscope or gyro-magnetic compass 60. For this purpose, interconnected selsyn signal generators 32, 33, one on each of the two devices have their output, representing the difference in magnitude and direction of the heading and runway directions, combined with the output of the amplifier 28' and led to the motor 20 as before. As is well known in the art, the A.C. output signal supplied by such generators is of a magnitude proportional to the angular error or difference between actual course (heading) and beacon or runway direction. The signal generators 32, 33 may, for example, be of the type disclosed in U.S. Patent No. 2,466,690 issued April 12, 1949, to R. S. Curry, Jr. and assigned to the same assignee as the present invention.

The device of FIG. 2 as so far described, would have a slight disadvantage as compared to the device of FIG. 1 in case a cross wind were blowing across the landing strip and localizer beam. In such event, the craft would reach a straight course displaced from, but parallel to the desired line of approach, the steady displacement signal being balanced by a steady heading (crabbing) signal. To overcome this difficulty, a correction may be interposed responsive to a persistent displacement signal to slowly readjust in effect, the runway setting dial 30'. This may be accomplished by making both parts of the selsyn signal generator 33 adjustable, one part from the knob 29' and the other part (field 33') from a motor 40 controlled by the output of the amplifier 28' and connected through large ratio reduction gearing to readjust slowly the rotatable field 33' of the selsyn 33 so as to bring the craft onto the true beam course. Such a mechanism is said to integrate the error or displacement signal with respect to time.

My invention is not only applicable for use as a blind landing indicator, but also as a control instrument for automatic pilots during blind landing. I have represented this arrangement by showing a selsyn transmitter 41 (FIG. 1) rotated by a relative tilt of the gyro 1 and the gimbal ring 3 and a similar selsyn transmitter 42 connected between the red index 11 and the gimbal ring 3. These transmitters are cross-connected in the usual fashion as shown in FIG. 2 to give an output proportional to the difference in pitch of the gyro with respect to the gimbal ring 3 and of the bar 11 with respect to said gimbal. In other words, the output is proportional to the pitch angle that the aviator sees in looking at the instrument. This output is fed through an amplifier in the usual manner to the elevator servo motor amplifier 44 controlling servo motor 45 for the elevator 46. Similarly, in roll a transmitter 41' is provided between the trunnion 4 of gimbal 3 and datum, and a second transmitter 42' between the hollow trunnion 14 of gimbal 13 supporting bar 11 and datum, the differential signal from the transmitters actuating the amplifier 44' which controls aileron servo motor 45' governing the ailerons 46'. During normal flight the rudder 50 is shown as operated from the rudder servo motor 51 controlled by amplifier 52 from the signal supplied from the selsyn transmitter or signal generator 33 when the switch 53 is moved down from the position shown in FIG. 2. At this time, it is understood that receiver 25 would be tuned in on the radio range signal toward which it is desired to fly. When, however, the craft is approaching a blind landing the control is transferred to the radio localizer beam, and the switch 53 is placed in the position shown in FIG. 2 to disconnect entirely the rudder automatic control and to throw the output of the generator 33 over to control the torque motor 20 in combination with the output of the localizer receiver 25 and amplifier 28' as above described, the error signal from transmitter 33 being combined with the signal from displacement amplifier 28' in place of the signals from amplifiers 28 and 34 of FIG. 1.

It will be understood that the transmitters 41, 42 and 41', 42' on the attitude gyro may control the ailerons 45' and elevator 46 at all times, that is, both during normal flight and during blind landing, since during normal flight the red bar 11 is maintained centralized, that is, substantially in line with index 10 on the craft by the centralizing springs 18' and 50.

It will be understood also that my invention is adapted to be used with other types of directional radio than localizer beams. For instance, it might be used with a homing radio automatic pilot designed to "home" on a broadcasting station as disclosed in the prior patent to Bert G. Carlson, No. 2,372,184, dated March 27, 1945, for Homing Automatic Pilots. In this case, the banking torquer 20 would be controlled by the departure of the craft from its radio course or radio line of position as indicated by the direction finder. Similarly my invention may be employed to automatically guide a craft through the automatic pilot along a course or radio line of position indicated by the Loran or omni-directional systems of radio navigation. In all cases, however, it is contemplated that as the landing field is being approached, the indicator or automatic pilot is placed under the control of the localizer and glide path beams.

Since many changes could be made in the above construction and many apparently widely different embodiments of this invention could be made without departing from the scope thereof, it is intended that all matter contained in the above description or shown in the accompanying drawings, shall be interpreted as illustrative and not in a limiting sense.

What is claimed is:

1. A visual indicator for aircraft whereby the craft may be caused to approach and thereafter maintain a ground track, comprising means for obtaining a first signal proportional to the magnitude of the displacement or distance of the craft from a chosen ground track reference, means for providing a second signal having a value depending upon the angle of craft approach toward said ground track, means for integrating at least a portion of said displacement signal with respect to time, means for producing a resultant signal proportional to the algebraic sum of said first and second signals corrected by the output of said integrating means, a pair of cooperating indices, and means for relatively moving said indices in accordance with said resultant signal.

2. A visual indicator for aircraft whereby the craft may be caused to approach and thereafter maintain a ground track, comprising radio receiver means for providing a first signal proportional to the lateral displacement of said craft from a radio beam defined ground track, means for providing a second signal dependent in value upon the heading of the craft with respect to said ground track, means for integrating at least a portion of the signal output of said radio receiver with respect to time and applying it as a correction to said heading signal, means for providing a resultant signal proportional to the algebraic sum of said first and corrected second signals, a pair of normally horizontal cooperating indices, and means for relatively tilting same from said resultant signal.

3. A visual indicator for aircraft whereby the craft may be caused to approach and thereafter maintain a radio defined ground track comprising a gyroscopically stabilized horizon bar, a normally fixed but adjustably mounted referenced index therefor, means for obtaining a first signal proportional to the magnitude of the displacement or distance of the craft from a chosen ground track, means for providing a second signal proportional to the magnitude of the angle of craft approach towards said ground track, means for integrating at least a portion of said displacement signal with respect to time, means for combining all three signals, and means for tilting said reference from its normal position by said combined signals whereby the aviator turns the craft toward the ground track to correct the indicated bank and the effect of side wind is eliminated.

4. A visual indicator for aircraft as claimed in claim 3, in which a directional gyroscope is utilized for giving craft approach angle.

5. A flight indicator for aiding radio guided landing approaches, the combination with a localizer or radio course receiver having an output, means for integrating at least a portion of said output to produce a signal, an attitude gyroscope, a pair of attitude indicators which are subject to relative tilting to thereby indicate the bank attitude of the craft, said tilting being in part controlled by said gyroscope, and means controlled from said receiver output and said signal also for imparting relative tilt thereto in a direction and proportional to both the displacement of the craft from its radio course and the integrated output of said receiver whereby the aviator, in apparently eliminating said tilt, banks the craft proportionally and in a direction to bring the craft back on to the radio course asymptotically and the effect of side wind is eliminated.

6. In a flight instrument for aiding steering of a craft in azimuth along a radio defined course, the combination with an attitude gyroscope, and means for generating a sense signal when the craft is off the course to the right or left proportional to the amount of off course, means for supplementing said signal by a term proportional to the integral of said signal with respect to time, a pair of relatively tiltable attitude indicators one of which at least is moved by said gyroscope and one of which at least is moved by said first signal, the relative tilt of which indicates the bank attitude of the craft, means for applying a torque to said gyroscope proportional to said integrated signal to alter the tilt thereof, whereby the relative tilt is jointly controlled by said gyroscope and by said supplemented sense and integrated signals, whereby the indicator falsely shows bank and the aviator in apparently eliminating the false bank actually banks the craft in a direction and amount to cause it to return asymptotically to the radio course regardless of side winds.

7. A visual indicator for aircraft including a gyro vertical whereby the craft may be caused to approach and thereafter maintain a ground track, comprising means for obtaining a first signal proportional to the magnitude of the displacement or distance of the craft from a chosen ground track, means for providing a second signal having a value depending upon the angle of craft approach toward said ground track, means for integrating at least a portion of said first signal with respect to time, means for producing a resultant signal proportional to the algebraic sum of said first and second signals modified by the output of said integrating means, a pair of normally horizontal cooperating indices, one of which is controlled in part at least from said gyro vertical, and means for relatively tilting said indices in accordance with said resultant signal thereby falsely indicating a bank, whereby the aviator in correcting said bank will bank the aircraft in a proper direction and amount to bring the airplane asymptotically to the prescribed ground track.

8. In a radio guided homing automatic pilot for aircraft whereby the craft may be caused to maintain a radio course, comprising means for obtaining a first signal proportional to the magnitude of the displacement of the craft from said radio course, means for providing a second signal having a value proportional to the angle of craft approach toward said radio course, means for integrating at least a portion of said displacement signal with respect to time, means for producing a resultant signal proportional to the algebraic sum of said first and second signals corrected by the output of said integrating means, and servo means for controlling the ailerons of said craft governed by said resultant signal.

9. In a radio guided homing automatic pilot for aircraft whereby the craft may be caused to maintain a radio course, comprising means for obtaining a first signal proportional to the magnitude of displacement of the craft from said radio course, means providing a second signal having a value proportional to the angle of craft approach toward said radio course, means for integrating at least a portion of said displacement signal with respect to time producing a third signal, means for producing a resultant signal proportional to the algebraic sum of said first, second and third signals, and servo means for controlling the ailerons of said craft governed by said resultant signal.

10. In a radio guided homing automatic pilot for aircraft whereby the craft may be caused to maintain a radio course, comprising means for obtaining a first signal proportional to the magnitude of displacement of the craft from said radio course, means providing a second signal having a value proportional to the angle of craft approach toward said radio course, means for integrating at least a portion of said displacement signal with respect to time producing a third signal, means for producing a signal proportional to the bank angle of the craft, means for producing a resultant signal proportional to the algebraic sum of all of said signals, and servo means for controlling the ailerons of said craft governed by said resultant signal.

References Cited in the file of this patent

UNITED STATES PATENTS

| | | |
|---|---|---|
| 2,482,809 | Thompson | Sept. 27, 1949 |
| 2,502,721 | Halpert | Apr. 4, 1950 |
| 2,590,428 | Noxon | Mar. 25, 1952 |
| 2,592,173 | Noxon et al. | Apr. 8, 1952 |